United States Patent
Dinh et al.

(10) Patent No.: US 7,257,592 B2
(45) Date of Patent: Aug. 14, 2007

(54) REPLICATING THE BLOB DATA FROM THE SOURCE FIELD TO THE TARGET FIELD BASED ON THE SOURCE CODED CHARACTER SET IDENTIFIER AND THE TARGET CODED CHARACTER SET IDENTIFIER, WHEREIN THE REPLICATING FURTHER COMPRISES CONVERTING THE BLOB DATA FROM THE SOURCE CODED CHARACTER SET IDENTIFIER TO THE TARGET CODED CHARACTER SET IDENTIFIER

(75) Inventors: Hung T. Dinh, Austin, TX (US); Phong A. Pham, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 558 days.

(21) Appl. No.: 10/607,567

(22) Filed: Jun. 26, 2003

(65) Prior Publication Data

US 2004/0267843 A1 Dec. 30, 2004

(51) Int. Cl.
G06F 17/00 (2006.01)
G06F 17/30 (2006.01)
G06F 17/20 (2006.01)

(52) U.S. Cl. .................. 707/101; 707/1; 707/100; 704/8

(58) Field of Classification Search ............. 707/1–2, 707/100–103 Y, 104.1; 382/245–248; 717/10, 717/113–114; 715/763, 839, 968; 704/7, 704/2, 8–9; 708/204

See application file for complete search history.

(56) References Cited

U.S. PATENT DOCUMENTS

| 5,878,220 | A | * | 3/1999 | Olkin et al. ................. 709/217 |
| 6,078,920 | A | | 6/2000 | Tan et al. ..................... 707/10 |
| 6,094,587 | A | * | 7/2000 | Armanto et al. ............. 455/567 |
| 6,112,024 | A | | 8/2000 | Almond et al. ............. 395/703 |
| 6,233,545 | B1 | * | 5/2001 | Datig ............................. 704/2 |
| 6,275,789 | B1 | * | 8/2001 | Moser et al. .................. 704/7 |

(Continued)

FOREIGN PATENT DOCUMENTS

EP 0698243 * 7/1999 ..................... 17/30

(Continued)

OTHER PUBLICATIONS

Sangho Park et al. segmentation and tracking of interacting human body parts under occlusion and shadowing, IEEE procedings of the workshop on motion and video computing, 2002, 7 pages.*

(Continued)

Primary Examiner—Srirama Channavajjala
(74) Attorney, Agent, or Firm—Marilyn S. Dawkins (57) ABSTRACT

A method, apparatus, processor, system, and signal-bearing medium that in an embodiment determine that blob (binary large object) data in a source field is associated with a source CCSID (Coded Character Set Identifier), determine a target CCSID for a target field, and replicate the blob data from the source field to the target field based on the source CCSID and the target CCSID. In this way, blob data can be converted between languages.

14 Claims, 4 Drawing Sheets

U.S. PATENT DOCUMENTS

| | | | |
|---|---|---|---|
| 6,275,831 B1 | 8/2001 | Bodnar et al. | 707/201 |
| 6,356,946 B1 | 3/2002 | Clegg et al. | 709/231 |
| 6,370,531 B1* | 4/2002 | Boutcher et al. | 707/10 |
| 6,370,541 B1* | 4/2002 | Chou et al. | 707/103 X |
| 6,424,976 B1* | 7/2002 | Jarvis et al. | 707/201 |
| 6,427,230 B1* | 7/2002 | Goiffon et al. | 717/108 |
| 6,446,133 B1* | 9/2002 | Tan et al. | 709/245 |
| 6,453,356 B1* | 9/2002 | Sheard et al. | 709/231 |
| 6,453,462 B1* | 9/2002 | Meade et al. | 717/124 |
| 6,560,596 B1* | 5/2003 | Margulies et al. | 707/4 |
| 6,615,219 B1* | 9/2003 | Bruso et al. | 707/102 |
| 6,732,109 B2* | 5/2004 | Lindberg et al. | 707/101 |
| 6,745,209 B2* | 6/2004 | Holenstein et al. | 707/203 |
| 6,961,681 B1* | 11/2005 | Choquier et al. | 703/2 |
| 7,065,484 B2* | 6/2006 | Low et al. | 704/8 |
| 2002/0032027 A1* | 3/2002 | Kirani et al. | 455/426 |
| 2002/0116405 A1 | 8/2002 | Bodnar et al. | 707/202 |
| 2003/0046317 A1* | 3/2003 | Cseri et al. | 707/513 |
| 2003/0208511 A1* | 11/2003 | Earl et al. | 707/204 |

FOREIGN PATENT DOCUMENTS

| | | | | |
|---|---|---|---|---|
| EP | 1331579 | * | 7/2003 | 17/30 |
| JP | 10011464 A | | 1/1998 | |
| JP | 10097456 A | | 4/1998 | |
| JP | 11143883 A | | 3/2002 | |
| WO | WO99/28835 | * | 6/1999 | |
| WO | WO 03/044737 | * | 5/2003 | |
| WO | WO 2005/083594 | * | 9/2005 | 17/30 |

OTHER PUBLICATIONS

Secom Co. Ltd. "Database Schema Design Strategy in Relational Database", VTT-MEMO-ADA-02, Aug. 6, 2001, 3 pages.*

Oracle 9i database globalization support guide release 2 (9.2), part No. A96529-01, copy right 2002, 20 pages.*

Oracle 9i database globalization support guide release 2 (9.2), part No. A96529-01, copy right 2002, 21 pages.*

Shapiro,M et al. "managing databases with binary large objects", Mass storage systems, 1999, 16th IEEE symposium , 1999, pp. 185-193.*

Qian,R.J et al. "Image retrieval using blob histograms", IEEE internatinal conference on multimedia and expo, 2000, vol. 1, pp. 125-128.*

Dvir,G et al. "context-based image modelling", proceedings, 16th internatinal conference on pattern recognition, 2002, vol. 4, pp. 162-165.*

Said,J et al. "transformatin of binary relations", The sixth international conference on computer supported cooperative work in design, 2001, pp. 575-580.*

Jim Gray et al. "scientific data management in the coming decade", Technical Report MSR-TR-2005-01 Microsoft research, Jan. 2005.*

Preethi Vishwanath, "Efficient replication of XML documents with BLOB data", CS297 Report, Dec. 2006.*

Randal Burns et al., Version Management and Recoverability for Large Object Data.

Andrew Laursen et al., Oracle Media Server: Providing Consumer Based Interactive Access to Multimedia Data, ACM, 1994, pp. 470-477.

Edward Grabczewski et al., 3D Murale: Multimedia Database System Architecture, Association for Computing Machinery, 2002, pp. 315-321.

Paul Dourish et al., Extending Document Management Systems with User-Specific Active Properties, ACM Transactions on Information Systems, vol. 18, No. 2, Apr. 2000, pp. 140-154.

Michael Ubell et al., Embedding Image Query Operations in an Object-Relational Database Management System, Feb. 9-10, 1995, SPIE vol. 2420, pp. 197-203.

INSPEC abstract Providing Multiple BLOB Types for Efficient Storage of Multimedia Data, Giho Choi et al., Journal of KISS (B) (Software and Applications), vol. 22, No. 10, pp. 1414-1415, Oct. 1995, only abstract.

INSPEC abstract, Embedding Image Query Operations in an Object-Relational Database Management System, M. et al., Illustra Inf. Technol. Inc., Proceedings of the SPIE—The International Society for Optical Engineering, vol. 2420, pp. 197-203, 1995.

Brian Sayrs, Architecting Multimedia Database Systems, Feb. 1997, Object Magazine, pp. 53-57.

Giho Choi et al., Providing Multiple BLOB Types for Efficient Storage of Multimedia-Data, vol. 22, No. 10, Oct. 1995, Journal off KISS (B) : Software and Applications, pp. 1404-1415, only abstract p. 1404.

* cited by examiner

REPLICATING THE BLOB DATA FROM THE SOURCE FIELD TO THE TARGET FIELD BASED ON THE SOURCE CODED CHARACTER SET IDENTIFIER AND THE TARGET CODED CHARACTER SET IDENTIFIER, WHEREIN THE REPLICATING FURTHER COMPRISES CONVERTING THE BLOB DATA FROM THE SOURCE CODED CHARACTER SET IDENTIFIER TO THE TARGET CODED CHARACTER SET IDENTIFIER

LIMITED COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever.

FIELD

An embodiment of the invention relates generally to the replication of binary large object data between character sets.

BACKGROUND

When computers were first developed, they mainly stored conventional numeric or character data. But today, computers are increasingly being used to store, access, and manipulate not only numeric and character data but also video images, still images, audio data, or a combination of types of data, which can require a large amount of storage. Because of their size, these types of data are often stored in databases in a special way in untyped objects called blobs (binary large objects). The blobs are untyped, meaning that the database system does not know the format of the data. Thus, blobs are typically stored in a database with only two attributes: a data value and a data length, which is the length of the data value.

The lack of formatting information causes a problem when attempting to convert blob data between languages when the blob data type is used to store character data. Modem computers are capable of supporting multiple languages with different character sets and converting their data between them. For example, the English language uses different characters than does the Russian, Chinese, Japanese, or Korean languages, and users would like to be able to convert their data between the different languages using a conversion program. Unfortunately, since blob data is untyped, the conversion program is unable to convert the blob data. In order to take advantage of blob data and to provide support for multiple languages, what is needed is a technique for converting blob data objects between languages.

SUMMARY

A method, apparatus, processor, system, and signal-bearing medium are provided that in an embodiment determine that blob (binary large object) data in a source field is associated with a source CCSID (Coded Character Set Identifier), determine a target CCSID for a target field, and replicate the blob data from the source field to the target field based on the source CCSID and the target CCSID. In this way, blob data can be converted between languages.

DETAILED DESCRIPTION

Figure 1:
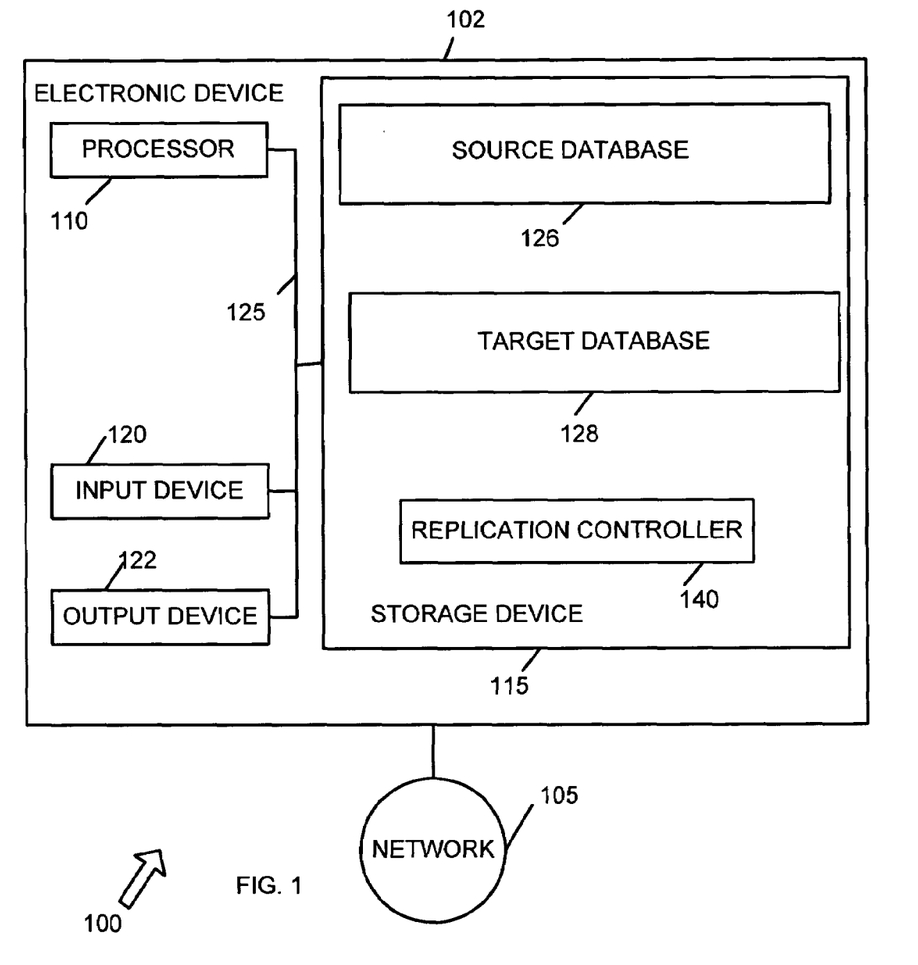
FIG. 1 depicts a block diagram of an example system for implementing an embodiment of the invention.

FIG. 1 depicts a block diagram of an example system 100 for implementing an embodiment of the invention. The system 100 includes an electronic device 102 connected to a network 105. Although only one electronic device 102 and one network 105 are shown, in other embodiments any number or combination of them may be present. In another embodiment, the network 105 is not present.

The electronic device 102 includes a processor 110 connected directly or indirectly to a storage device 115, an input device 120, and an output device 122 via a bus 125. The processor 110 represents a central processing unit of any type of architecture, such as a CISC (Complex Instruction Set Computing), RISC (Reduced Instruction Set Computing), VLIW (Very Long Instruction Word), or a hybrid architecture, although any appropriate processor may be used. Although not depicted in FIG. 1, the processor 110 may include a variety of elements not necessary to understanding an embodiment of the invention. For example, the processor 110 may also include a variety of execution units for executing instructions during a processor cycle, a bus interface unit for interfacing to the bus 125, a fetcher for fetching instructions, and queues and/or caches for holding instructions and data. In other embodiments, the processor 110 may include any appropriate elements.

The processor 110 executes instructions and includes that portion of the electronic device 102 that controls the operation of the entire electronic device. The processor 110 reads and/or stores code and data to/from the storage device 115 and/or the network 105, reads data from the input device 120 and writes data to the output device 122.

Although the electronic device 102 is shown to contain only a single processor 110 and a single bus 125, the present invention applies equally to electronic devices that may have multiple processors and multiple buses with some or all performing different functions in different ways.

The storage device 115 represents one or more mechanisms for storing data. For example, the storage device 115 may include random access memory (RAM), removable or fixed magnetic-disk storage media, optical storage media, flash memory devices, and/or other machine-readable media. In other embodiments, any appropriate type of storage device may be used. Although only one storage device 115 is shown, multiple storage devices and multiple types and levels of storage devices may be present. Further, although the electronic device 102 is drawn to contain the storage device 115, it may be distributed across other electronic devices, for example electronic devices connected via a network, such as the network 105.

The storage device 115 includes a source database 126, a target database 128, and a replication controller 140.

The source database 126 contains data to be converted. In an embodiment the source database 126 is a relational database, but in other embodiments, any appropriate data repository may be used. The target database 128 contains data converted from the source database 126. In an embodiment, the target database 128 is a relational database, but in other embodiments, any appropriate data repository may be used. Although the source database 126 and the target database 128 are shown to be within the storage device 115 in the electronic device 102, in other embodiments they may be contained in different storage devices and may be within different electronic devices, e.g., in or associated with different electronic devices connected via the network 105. The source database 126 and the target database 128 are further described below with reference to FIGS. 2 and 3.

The replication controller 140 may include instructions capable of being executed by the processor 110 and/or statements capable of being interpreted by instructions that execute on the processor 110. In another embodiment, some or all of the functions of the replication controller 140 may be implemented via logic gates and/or other hardware mechanisms in lieu of or in addition to a processor-based system. The replication controller 140 replicates the source database 126 to the target database 128 while translating select fields in the database. The functions of the replication controller 140 are further described below with reference to FIG. 4.

The input device 120 may be a keyboard, mouse or other pointing device, trackball, touchpad, touchscreen, keypad, microphone, voice recognition device, or any other appropriate mechanism for the user to input data to the electronic device 102. Although only one input device 120 is shown, in another embodiment any number and type of input devices may be present. In an embodiment, a user may use the input device 120 to invoke the replication controller 140, but in other embodiments the replication controller 140 may be invoked from another routine or via any other appropriate mechanism.

The output device 122 is that part of the electronic device 102 that presents output to the user. The output device 122 may be a cathode-ray tube (CRT) based video display well known in the art of computer hardware. But, in other embodiments the output device 122 may be replaced with a liquid crystal display (LCD) based or gas, plasma-based, flat-panel display. In still other embodiments, any appropriate display device may be used. In other embodiments, a speaker or a printer may be used. In other embodiments any appropriate output device may be used. Although only one output device 122 is shown, in other embodiments, any number of output devices of different types or of the same type may be present.

The bus 125 may represent one or more busses, e.g., PCI (Peripheral Component Interconnect), ISA (Industry Standard Architecture), X-Bus, EISA (Extended Industry Standard Architecture), or any other appropriate bus and/or bridge (also called a bus controller).

The electronic device 102 may be implemented using any suitable hardware and/or software, such as a personal computer. Portable computers, laptop or notebook computers, PDAs (Personal Digital Assistants), pocket computers, telephones, pagers, automobiles, teleconferencing systems, appliances, and mainframe computers are examples of other possible configurations of the electronic device 102. The hardware and software depicted in FIG. 1 may vary for specific applications and may include more or fewer elements than those depicted. For example, other peripheral devices such as audio adapters, or chip programming devices, such as EPROM (Erasable Programmable Read-Only Memory) programming devices may be used in addition to or in place of the hardware already depicted.

The network 105 may be any suitable network or combination of networks and may support any appropriate protocol suitable for communication of data and/or code to/from the electronic device 102. In various embodiments, the network 105 may represent a storage device or a combination of storage devices, either connected directly or indirectly to the electronic device 102. In an embodiment, the network 105 may support Infiniband. In another embodiment, the network 105 may support wireless communications. In another embodiment, the network 105 may support hard-wired communications, such as a telephone line or cable. In another embodiment, the network 105 may support the Ethernet IEEE (Institute of Electrical and Electronics Engineers) 802.3x specification. In another embodiment, the network 105 may be the Internet and may support IP (Internet Protocol). In another embodiment, the network 105 may be a local area network (LAN) or a wide area network (WAN). In another embodiment, the network 105 may be a hotspot service provider network. In another embodiment, the network 105 may be an intranet. In another embodiment, the network 105 may be a GPRS (General Packet Radio Service) network. In another embodiment, the network 105 may be any appropriate cellular data network or cell-based radio network technology. In another embodiment, the network 105 may be an IEEE 802.11B wireless network. In still another embodiment, the network 105 may be any suitable network or combination of networks. Although one network 105 is shown, in other embodiments any number of networks (of the same or different types) may be present.

As will be described in detail below, aspects of an embodiment of the invention pertain to specific apparatus and method elements implementable on a computer, processor, or other electronic device. In another embodiment, the invention may be implemented as a program product for use with a computer, processor, or other electronic device. The programs defining the functions of this embodiment may be delivered to the computer, processor, or other electronic device via a variety of signal-bearing media, which include, but are not limited to:

(1) information permanently stored on a non-rewriteable storage medium, e.g., a read-only memory device attached to or within a computer, processor, or other electronic device, such as a CD-ROM readable by a CD-ROM drive;

(2) alterable information stored on a rewriteable storage medium, e.g., a hard disk drive or diskette; or (3) information conveyed to a computer, processor, or other electronic device by a communications medium, such as through a computer or a telephone network, e.g., the network 105, including wireless communications.

Such signal-bearing media, when carrying machine-readable instructions that direct the functions of the present invention, represent embodiments of the present invention.

Figure 2:
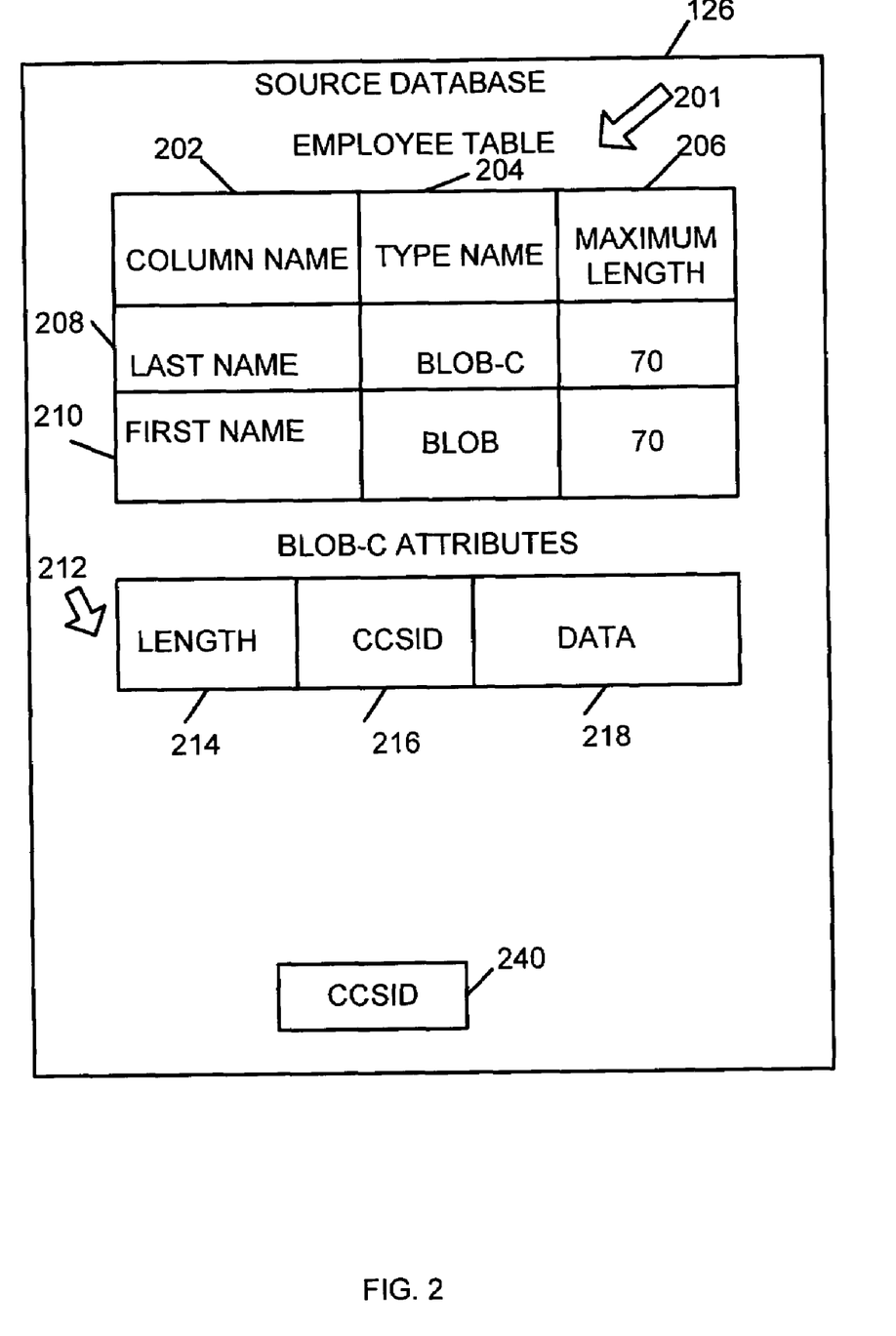
FIG. 2 depicts a block diagram of an example format and data for a source database, according to an embodiment of the invention.

FIG. 2 depicts a block diagram of an example format and data for the source database 126. The source database 126 includes a table 201, attributes 212, and a CCSID 240. In the example shown, the table 201 is an employee table, but any type of appropriate table may be used. The table 201 includes a column name 202, a type name 204, and a maximum length 206.

The table 201 also includes fields 208 and 210. In the example shown, the field 208 includes "last name" for the column name in the column 202, "blob-c" (binary large object-character) for the type name in the column 204, and "70" for the maximum length in the column 206. The blob-c type name indicates that the attributes data structure 212 is present and contains a CCSID (Coded Character Set Identifier), as further described below. In the example shown, the field 210 includes "first name" for the column name in the column 202, "blob" (binary large object) for the type name in the column 204, and "70" for the maximum length in the column 206. Although two fields 208 and 210 are shown, in other embodiments any appropriate number of fields may be present. Although blob-c and blob are illustrated as example type names, in other embodiments, the type names may be binary, character, or any other appropriate data type.

The attributes 212 includes a length field 214, a CCSID (Coded Character Set Identifier) field 216, and a data field 218. The length field 214 specifies the actual length of the data field 218 while the maximum length field 206 specifies the maximum length of the attributes. A CCSID identifies a group of character sets, code pages, and encoding schemes. A CCSID is often used for languages that use multiple code pages, but in other embodiments, a CCSID may be used for any language. Examples of a languages with multiple code pages are Japanese and Korean, although in other embodiments any appropriate language may be used. A character set is a group of characters. An example of a character set is DBCS (Double Byte Character Set), but in other embodiments any appropriate character set may be used.

A code page is a group of specifications of code points (e.g., integer numbers) for each character in the character set. The exact code point value for a character in a character set is found using the code page.

An encoding scheme is a plan for the encoding and/or decoding of characters. When a character is converted from one code page to another, the encoding scheme controls the conversion.

The CCSID 240 is applicable to the entire source database 126 and all data in the source database 126 is stored using the CSSID 240. In contrast, the BLOB-C attribute has its own CCSID 216, which is stored at the record level, i.e., in some embodiments each row in a table may have a different CCSID. When the replication controller 140 (FIG. 1) replicates the source database 126, the replication controller 140 uses the CCSID 240 to replicate the data except when data has its own CCSID, such as CCSID 216, as further described below with reference to FIG. 4.

The data shown in the table 201 and the attributes 212 is exemplary only and any appropriate data may be used.

Figure 3:
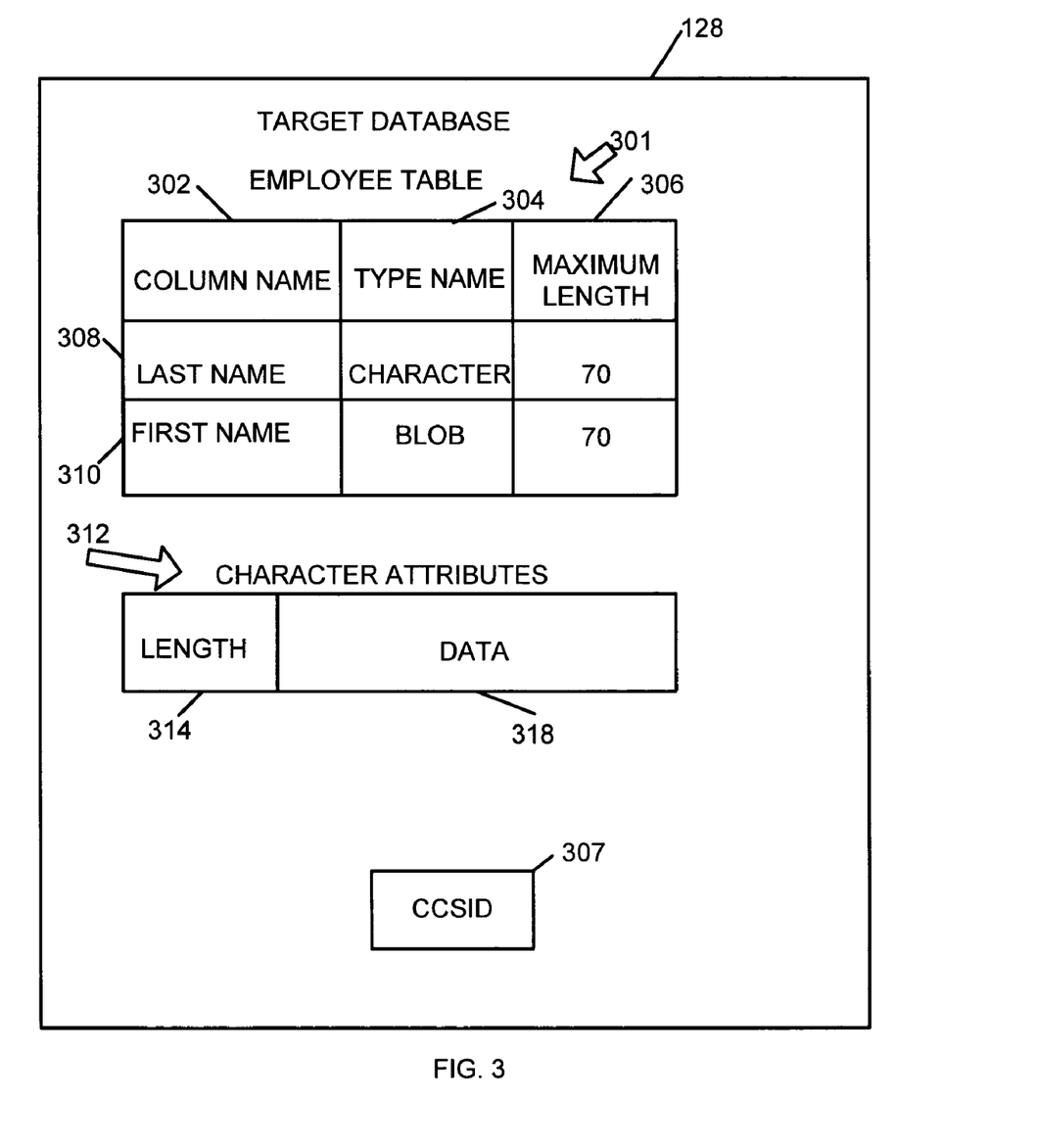
FIG. 3 depicts a block diagram of an example format and data for a target database, according to an embodiment of the invention.

FIG. 3 depicts a block diagram of an example format and data for the target database 128, according to an embodiment of the invention. The target database 128 includes a table 301, attributes 312, and a CCSID 307. In the example shown, the table 301 is an employee table, but any type of appropriate table may be used. The table 301 includes a column name 302, a type name 304, and a maximum length 306.

The table 301 also includes fields 308 and 310. In the example shown, the field 308 includes "last name" for the column name in the column 302, "character" for the type name in the column 304, and "70" for the maximum length of the attributes 312 in the column 306. The "character" data type name indicates that the attributes data structure 312 is present and uses the value in the CCSID field 307, which is defined at the database level. The use of "character" as a data type may refer in various embodiments to any type of character data, such as CHARACTER, VARCHAR (Variable Character), CLOB (Character Large Object), or any other appropriate type of character data. A CCSID identifies a group of character sets, code pages, and encoding schemes.

In the example shown, the field 310 includes "first name" for the column name in the column 302, "blob" for the type name in the column 304, and "70" for the maximum length in the column 306. Although two fields 308 and 310 are shown, in other embodiments any appropriate number of fields may be present. Although "character" and "blob" are illustrated as example type names, in other embodiments, the type names may be binary or any other appropriate data type.

The attributes 312 includes a length field 314, and a data field 318. The length field 314 specifies the actual length of the data field 318 while the maximum length field 306 specifies the maximum length of the attributes 312.

The CCSID 307 identifies a group of character sets, code pages, and encoding schemes. A code page is a group of specifications of code points (e.g., integer numbers) for each character in the character set. The exact code point value for a character in a character set is found using the code page.

An encoding scheme is a plan for the encoding and/or decoding of characters. When a character is converted from one code page to another, the encoding scheme controls the conversion. An example of an encoding scheme used in an embodiment is UTF-8 (Universal Character Set Transformation-8), which is defined by ISO (International Standards Organization) 10646-1:2000 Annex D and is also described in RFC (Request for Comments) 2279. But in other embodiments, UTF-16, UTF-32, or any other appropriate encoding scheme may be used.

The data shown in the table 301 and the attributes 312 is exemplary only and any appropriate data may be used.

Figure 4:
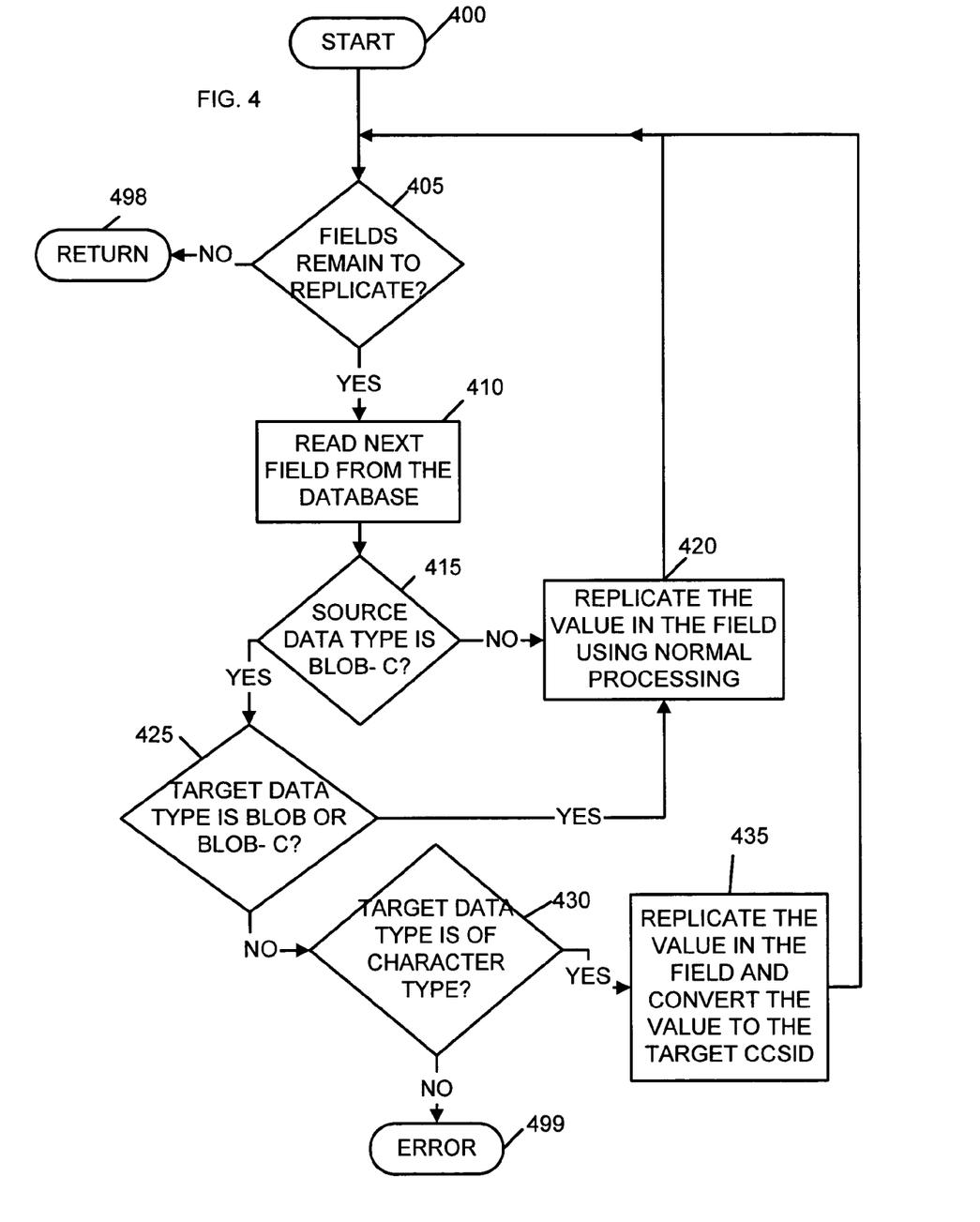
FIG. 4 depicts a flowchart of example processing, according to an embodiment of the invention.

FIG. 4 depicts a flowchart of example processing, according to an embodiment of the invention. Control begins at block 400. Control then continues to block 405 where the replication controller 140 determines whether there are any fields remaining in the source database 126 that still need to be replicated. Examples of fields are shown in FIG. 2 as fields 208 and 210, as previously described above. If the determination at block 405 is false, then the replication for the source database 126 is complete, so control continues to block 498 where the replication controller 140 returns.

If the determination at block 405 is true, then replication of the database 126 is not yet complete, so control continues to block 410 where the replication controller 140 reads the next field from the source database 126. Using the example shown in FIG. 2, elements 208 and 210 are fields in the source database 126 that may be read and processed by the replication controller 140.

Control then continues to block 415 where the replication controller 140 determines whether the data type name in the source database 126 is blob-c (blob character). The blob-c data type signifies that the blob data has an associated CCSID. In the example shown in FIG. 2, the data type name in the source database 126 is illustrated in field 204. If the determination at block 415 is false, then the source data type name is not blob-c (blob character), so control continues to block 420 where the replication controller 140 replicates the value in the data field using normal processing, the CCSID 240, and the CCSID 307. Control then returns to block 405, as previously described above.

If the determination at block 415 is true, then control continues to block 425 where the replication controller 140 determines whether the data type name in the target database 128 is blob or blob-c (blob character). In the example shown in FIG. 3, the data type name in the target database 128 is illustrated in field 304. If the determination at block 425 is true, then control continues to block 420, as previously described above.

If the determination at block 425 is false, then control continues to block 430 where the replication controller 140 determines whether the data type name in the target database 128 is character. If the determination at block 430 is false, then control continues to block 499 where the replication controller 140 returns an error since, in an embodiment, the replication controller 140 is not able to translate data of type blob-c (blob character) to data types other than blob, blob-c (blob character), or character. But, in other embodiments, the replication controller can translate any appropriate data types.

If the determination at block 430 is true, then control continues to block 435 where the replication controller 140 replicates the value in the field and converts the blob-c data to the character type having the target CCSID 307. The data is converted from the source CCSID 216 to the target CCSID 307 using a normal conversion method. In an embodiment, a mapping file is used to map characters from the source CCSID 216 to the target CCSID 307, but in other embodiments any appropriate conversion technique may be used. In the examples of FIGS. 2 and 3, the replication controller replicates and converts the data 218 to the data 318. Control then returns to block 405, as previously described above.

In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. Different instances of the word "embodiment" as used within this specification do not necessarily refer to the same embodiment, but they may. The previous detailed description is, therefore, not to be taken in a limiting sense, and the scope of the present invention is defined only by the appended claims.

In the previous description, numerous specific details were set forth to provide a thorough understanding of the invention. But, the invention may be practiced without these specific details. In other instances, well-known circuits, structures, and techniques have not been shown in detail in order not to obscure the invention.

What is claimed is:

1. A method for replicating blob data comprising:
   determining that the blob data in a source field is associated with a first coded character set identifier;
   determining a second coded character set identifier for a target field; and
   replicating the blob data from the source field to the target field based on the first coded character set identifier and the second coded character set identifier, wherein the replicating further comprises converting the blob data from the first coded character set identifier to the second coded character set identifier, wherein the first coded character set identifier specifies a first character set, a first code page, and a first encoding scheme, wherein the second coded character set identifier specifies a second character set, a second code page, and a second encoding scheme, and wherein the first code page comprises a group of specifications of code points for each character in the first character set, and stored in a data repository.

2. The method of claim 1, wherein the target field has an associated type of character.

3. The method of claim 1, wherein the character set is double byte character set.

4. The method of claim 1, wherein the second encoding scheme is Universal Character Set Transformation-8.

5. A signal-bearing medium encoded with instructions, wherein the instructions when executed by a processor comprise:
   determining that blob data in a source field is associated with a first coded character set identifier;
   determining a second coded character set identifier for a target field, wherein the target field has an associated type of character; and
   replicating the blob data from the source field to the target field based on the first coded character set identifier and the second coded character set identifier, wherein the replicating further comprises converting the blob data from the first coded character set identifier to the second coded character set identifier, wherein the first coded character set identifier specifies a first character set, a first code page, and a first encoding scheme, wherein the second coded character set identifier specifies a second character set, a second code page, and a second encoding scheme, and wherein the first code page comprises a group of specifications of code points for each character in the first character set, and stored in a data repository.

6. The signal-bearing medium of claim 5, wherein the character set is double byte character set.

7. The signal-bearing medium of claim 5, wherein the second encoding scheme is Universal Character Set Transformation-8.

8. A signal-bearing medium encoded with a data structure, wherein the data structure comprises:
   a source field including a data type; and
   an attribute for the data type, wherein a replication controller is to
      determine whether data associated with the data type is blob,
      determine a source coded character set identifier associated with the data type, wherein the source coded character set identifier specifies a source character set, a source code page, and a source encoding scheme, wherein the source character set is double byte character set, and wherein the source code page comprises a group of specifications of code points for each character in the source character set, and
      replicate the data to a target field based on the source coded character set identifier and a target coded character set identifier, and convert the blob data from the source coded character set identifier to the target coded character set identifier, and stored in a data repository.

9. The signal-bearing medium of claim 8, wherein the target field has an associated type of character.

10. The signal-bearing medium of claim 8 wherein the target coded character set identifier specifies a target character set, a target code page, and a target encoding scheme.

11. The signal-bearing medium of claim 10, wherein the target encoding scheme is Universal Character Set Transformation-8.

12. An electronic device that replicates blob data, wherein the electronic device comprises:

a processor; and a storage device encoded with instructions that when executed on the processor comprise:

determining that the blob data in a source field is associated with a source coded character set identifier, wherein the source coded character set identifier specifies a source character set, a source code page, and a source encoding scheme, wherein the source character set is double byte character set, and wherein the source code page comprises a group of specifications of code points for each character in the source character set, determining a target coded character set identifier for a target field, wherein the target field has an associated type of character, and wherein the target coded character set identifier specifies a target character set, a target code page, and a target encoding scheme, and replicating the blob data from the source field to the target field based on the source coded character set identifier and the target coded character set identifier, wherein the replicating further comprises converting the blob data from the source coded character set identifier to the target coded character set identifier, and stored in a data repository.

13. The electronic device of claim 12, wherein the source encoding scheme is Universal Character Set Transformation-8.

14. The electronic device of claim 12, wherein the source field is in a source relational database and the target field is in a target relational database.

\* \* \* \* \*